United States Patent
Chang et al.

(10) Patent No.: US 6,963,548 B1
(45) Date of Patent: Nov. 8, 2005

(54) COHERENT SYNCHRONIZATION OF CODE DIVISION MULTIPLE ACCESS SIGNALS

(75) Inventors: Donald C. D. Chang, Thousand Oaks, CA (US); Kar W. Yung, Torrance, CA (US); David C. Cheng, Palos Verdes Estates, CA (US); Frank A. Hagen, Palos Verdes Estates, CA (US); Ming U. Chang, Rancho Palos Verdes, CA (US); John I. Novak, III, West Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/550,505

(22) Filed: Apr. 17, 2000

(51) Int. Cl.[7] .......................... H04B 7/26; H04B 1/707
(52) U.S. Cl. ...................................... 370/320; 370/517
(58) Field of Search ................................ 370/517, 324, 370/350, 503, 515, 316, 315, 310, 320, 580, 519; 455/500, 502, 503, 13.2

(56) References Cited

U.S. PATENT DOCUMENTS

| | | | |
|---|---|---|---|
| 3,384,891 A | | 5/1968 | Anderson |
| 3,544,995 A | | 12/1970 | Bottenberg et al. |
| 3,593,138 A | * | 7/1971 | Dunn et al. ............... 375/211 |
| 3,611,435 A | * | 10/1971 | Cooper ..................... 375/211 |
| 3,742,498 A | * | 6/1973 | Dunn ......................... 342/88 |
| 3,982,075 A | * | 9/1976 | Jefferis et al. ........... 370/324 |
| 4,019,138 A | * | 4/1977 | Watanabe et al. ........ 455/13.2 |
| 4,161,730 A | | 7/1979 | Anderson |
| 4,161,734 A | | 7/1979 | Anderson |
| 4,359,733 A | | 11/1982 | O'Neill |
| 4,555,782 A | * | 11/1985 | Alaria et al. ............. 370/324 |
| 4,613,864 A | | 9/1986 | Hofgen |
| 4,819,227 A | | 4/1989 | Rosen |
| 4,897,661 A | | 1/1990 | Hiraiwa |

(Continued)

FOREIGN PATENT DOCUMENTS

| | | |
|---|---|---|
| EP | 0 335 558 | 4/1989 |
| EP | 0682 416 A2 | 11/1995 |
| EP | 0 749 252 A | 12/1996 |
| EP | 0 776 099 A2 | 5/1997 |
| EP | 0776099 A2 | 5/1997 |
| EP | 0837568 A2 | 4/1998 |
| EP | 0 845 874 A | 6/1998 |
| EP | 0 860 708 A | 8/1998 |
| EP | 0 860 709 A | 8/1998 |
| EP | 0 860 710 A2 | 8/1998 |
| EP | 1037403 A2 | 9/2000 |
| WO | WO96/22661 | 7/1996 |

OTHER PUBLICATIONS

Colella, Nicholas J. et al., "The HALO Network™", IEEE Communications Magazine, Jun. 2000, pp. 142–148.

(Continued)

*Primary Examiner*—Chi Pham
*Assistant Examiner*—Derrick W Ferris
(74) *Attorney, Agent, or Firm*—Georgann S. Grunebach

(57) ABSTRACT

A novel method and apparatus is described for reducing the number of CDMA codes for a constellation of multiple trasponder platforms serving a number of subscribers in the same service area. A coherent processing technique synchronizes the phase of CDMA signals arriving at a subscriber from multiple trasponder platforms to increase the code capacity and thus the number of possible subscribers for most of the multiple transponder platform systems in current use.

12 Claims, 8 Drawing Sheets

U.S. PATENT DOCUMENTS

| | | | | |
|---|---|---|---|---|
| 4,901,307 A | * | 2/1990 | Gilhousen et al. | 370/320 |
| 4,979,170 A | | 12/1990 | Gilhousen et al. | |
| 4,994,809 A | | 2/1991 | Yung et al. | |
| 5,006,855 A | | 4/1991 | Braff | |
| 5,077,562 A | | 12/1991 | Chang et al. | |
| 5,077,759 A | * | 12/1991 | Nakahara | 375/356 |
| 5,109,390 A | * | 4/1992 | Gilhousen et al. | 370/335 |
| 5,111,209 A | | 5/1992 | Toriyama | |
| 5,126,748 A | | 6/1992 | Ames et al. | |
| 5,218,619 A | | 6/1993 | Dent | |
| 5,233,626 A | * | 8/1993 | Ames | 375/148 |
| 5,245,612 A | | 9/1993 | Kachi et al. | |
| 5,278,863 A | | 1/1994 | Briskman | |
| 5,319,673 A | | 6/1994 | Briskman | |
| 5,327,455 A | | 7/1994 | DeGaudenzi | |
| 5,361,398 A | * | 11/1994 | Christian et al. | 455/503 |
| 5,365,447 A | | 11/1994 | Dennis | |
| 5,379,320 A | | 1/1995 | Fernandes et al. | |
| 5,416,808 A | * | 5/1995 | Witsaman et al. | 375/356 |
| 5,423,058 A | * | 6/1995 | Cudak et al. | 455/503 |
| 5,423,059 A | | 6/1995 | LoGalbo et al. | |
| 5,444,450 A | | 8/1995 | Olds et al. | |
| 5,467,282 A | | 11/1995 | Dennis | |
| 5,485,485 A | | 1/1996 | Briskman et al. | |
| 5,510,797 A | * | 4/1996 | Abraham et al. | 342/352 |
| 5,550,809 A | | 8/1996 | Bottomley et al. | |
| 5,555,257 A | | 9/1996 | Dent | |
| 5,572,216 A | | 11/1996 | Weinberg et al. | |
| 5,589,834 A | | 12/1996 | Weinberg | |
| 5,592,471 A | | 1/1997 | Briskman | |
| 5,594,941 A | | 1/1997 | Dent | |
| 5,608,722 A | * | 3/1997 | Miller | 370/320 |
| 5,612,701 A | | 3/1997 | Diekelman | |
| 5,613,219 A | * | 3/1997 | Vogel et al. | 455/78 |
| 5,617,410 A | * | 4/1997 | Matsumoto | 370/342 |
| 5,625,640 A | * | 4/1997 | Palmer et al. | 375/132 |
| 5,644,572 A | | 7/1997 | Olds et al. | |
| 5,696,766 A | * | 12/1997 | Yeung et al. | 370/515 |
| 5,764,188 A | | 6/1998 | Ghosh et al. | |
| 5,790,070 A | | 8/1998 | Natarajan et al. | |
| 5,828,659 A | * | 10/1998 | Teder et al. | 370/328 |
| 5,839,053 A | | 11/1998 | Bosch et al. | |
| 5,856,804 A | | 1/1999 | Turcotte et al. | |
| 5,864,579 A | | 1/1999 | Briskman | |
| 5,867,109 A | | 2/1999 | Wiedeman | |
| 5,878,034 A | | 3/1999 | Hershey et al. | |
| 5,890,067 A | | 3/1999 | Chang et al. | |
| 5,903,549 A | | 5/1999 | Von der Embse et al. | |
| 5,907,813 A | | 5/1999 | Johnson, Jr. et al. | |
| 5,909,460 A | | 6/1999 | Dent | |
| 5,909,470 A | * | 6/1999 | Barratt et al. | 375/324 |
| 5,918,157 A | | 6/1999 | Wiedeman et al. | |
| 5,920,284 A | | 7/1999 | Victor | |
| 5,940,774 A | | 8/1999 | Schmidt et al. | |
| 5,943,331 A | * | 8/1999 | Lavean | 370/335 |
| 5,944,770 A | | 8/1999 | Enge et al. | |
| 5,945,948 A | | 8/1999 | Buford et al. | |
| 5,949,766 A | | 9/1999 | Ibanez-Meier et al. | |
| 5,956,619 A | | 9/1999 | Gallagher et al. | |
| 5,966,371 A | | 10/1999 | Sherman | |
| 5,969,674 A | | 10/1999 | Von der Embse et al. | |
| 5,974,039 A | | 10/1999 | Schilling | |
| 5,982,337 A | | 11/1999 | Newman et al. | |
| 5,983,113 A | * | 11/1999 | Asanuma | 455/506 |
| 6,020,845 A | | 2/2000 | Weinberg et al. | |
| 6,028,884 A | | 2/2000 | Silberger et al. | |
| 6,040,798 A | | 3/2000 | Kinal et al. | |
| 6,067,442 A | | 5/2000 | Wiedeman et al. | |
| 6,138,012 A | | 10/2000 | Krutz et al. | |
| 6,151,308 A | | 11/2000 | Ibanez-Meier et al. | |
| 6,295,440 B2 | | 9/2001 | Chang et al. | |
| 6,337,980 B1 | | 1/2002 | Chang et al. | |
| 6,615,024 B1 | * | 9/2003 | Boros et al. | 455/69 |

OTHER PUBLICATIONS

Colella, Nicholas J. et al., "High Speed Internet Access via Stratospheric HALO Aircraft", INET 99 Proceedings, Internet Society, Technology, Wireless, 13 pages, Jun. 8, 1999.

Colella, Nicholas, "HALO Network—The Birth of Stratospheric Communications Services & the Decline of Satellite Networks", http://www.angelhalo.com/techpaper6, Copyright 1997–1999.

Chan, K. K., et. al, "A Circularly Polarized Waveguide Array For Leo Satellite Communications", Antennas and Propagation Society, 1999, IEEE International Symposium, vol. 1, Jul. 11–16, 1999, pp. 154–157.

Oodo, M., et. al, "Onboard DBF Antenna for Stratospheric Platform", 2000 IEEE International Conference on Phased Array Systems and Technology, Proceedings, May 21–25, 2000, pp. 125–128.

Yokosuka Research Park, "The First Stratospheric Platform Systems Workshop", May 12–13, 1999, pp. 1–216.

* cited by examiner

COHERENT SYNCHRONIZATION OF CODE DIVISION MULTIPLE ACCESS SIGNALS

BACKGROUND OF THE INVENTION

The present invention relates generally to code division multiple access (CDMA) communications systems. More specifically, but without limitation thereto, the present invention relates to a method for reducing the number of CDMA codes required for a number of subscribers serviced by multiple transponder platforms.

Traditionally, when multiple satellites become available over a given geographic location, two or more nearby users may not use the same frequency spectrum or code space due to interference. Also, as the number of subscribers within a service area increases, the frequency bandwidth, the number of CDMA codes, or both must be increased to avoid interference from messages intended for other subscribers. The number of subscribers is therefore limited by the frequency bandwidth and the number of CDMA codes.

Methods for reducing the number of CDMA codes for a service area effectively increase the bandwidth of the frequency spectrum by providing a greater portion of the information in communications signals to be used for subscriber communication rather than for distinguishing one subscriber from another.

Although multiple transponder platforms, e.g. satellites, increase the system availability, their full potential has been unrealized because of the limit on the number of users imposed by the assigned frequency bandwidth and the number of available codes. In conventional asynchronous CDMA single satellite communication systems, unique CDMA codes are assigned to each user to ensure that information directed to one subscriber does not interfere with information directed to another subscriber. Similarly, in multiple satellite communication systems, when two or more satellites are serving in the same geographical location, unique CDMA codes within the same frequency bandwidth are generally used to distinguish each subscriber. Using the same CDMA code for multiple subscribers would result in mutual interference that would prevent the proper decoding of information, because the omnidirectional receiving antennas of the subscribers' terminals lack the capability to discriminate spatially among the satellites.

SUMMARY OF THE INVENTION

A novel method and apparatus is described for reducing the number of CDMA codes for a constellation of multiple transponder platforms serving a number of subscribers in the same service area. A coherent processing technique synchronizes the phase of CDMA signals arriving at a subscriber from multiple transponder platforms to increase the code capacity and thus the number of possible subscribers for most of the multiple transponder platform systems in current use. For example, the subscribers may use simple terminals with nearly omnidirectional antennas for receiving signals from multiple satellites concurrently.

One advantage of the present invention is that a greater number of subscribers may be accommodated within a service area without increasing the frequency spectrum or the number of CDMA codes.

Another advantage is that multiple transponder platforms may be used to enhance the signal gain for most of the subscribers in the service area.

Still another advantage is that the cost of receiving terminals is substantially reduced due to simpler operation and fewer components.

Yet another advantage is that the positions of each transponder platform and subscriber in the constellation need not be known to practice the present invention.

Still another advantage is that inexpensive terminals may be used with omnidirectional antennas without sacrificing performance.

The features and advantages summarized above in addition to other aspects of the present invention will become more apparent from the description, presented in conjunction with the following drawings.

DESCRIPTION OF THE INVENTION

The following description is presented to disclose the currently known best mode for making and using the present invention. The scope of the invention is defined by the claims.

Figure 1:
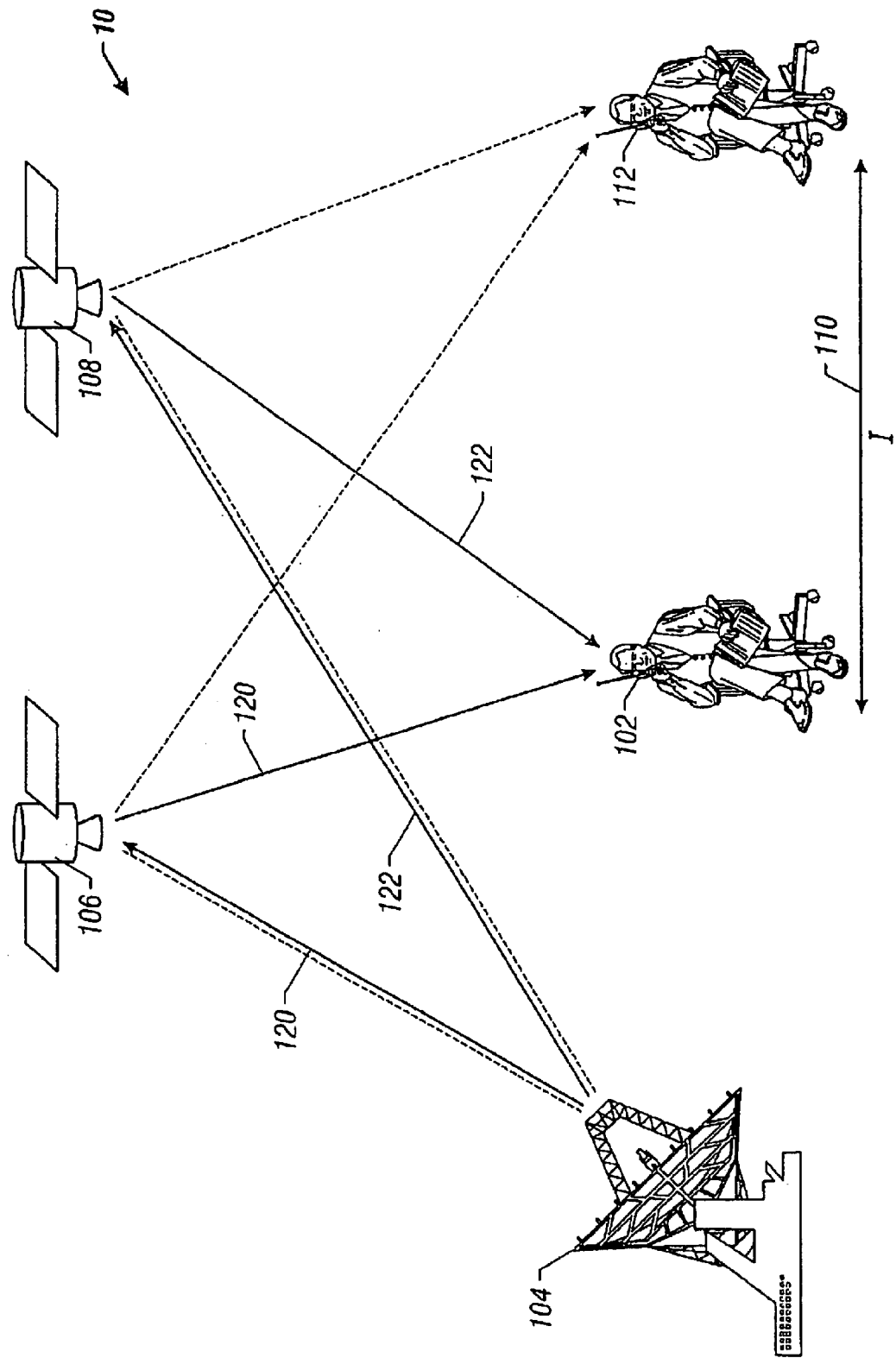
FIG. 1 is a diagram illustrating an exemplary multiple transponder platform communications system suitable for use with the present invention.

FIG. 1 is a ram illustrating an exemplary multiple satellite communications system 10 suitable for use With the present invention for coherent synchronization of CDMA communications signals. In this example, single transponder satellites represent transponder platforms and cellular telephones represent subscribers. Alternatively, the transponder platforms may also be carrier signal frequency reflecting surfaces, and the subscribers may also be fixed or mobile terminals. Other suitable devices with sufficient field of view to cover the directions from which subscriber signals arrive and combinations thereof for relaying a signal from a gateway to a subscriber may also be use, whether fixed or mobile, on the ground, in the air, or in space. Similarly, subscribers may be any suitable devices and combinations thereof employed for CDMA communications, whether fixed or mobile, on the ground, airborne, or in space.

A first forward link CDMA signal 120 is transmitted by a hub or gateway 104 to satellite 106 and relayed from satellite 106 to intended subscriber 102. A second forward link CDMA signal 122 is sent by gateway 104 to satellite 108 and relayed from satellite 108 to intended subscriber 102. The sequence of forward link CDMA signals may be sent at different times or otherwise arranged by well known techniques to avoid mutual interference during the synchronization process. Subscriber 102 logs the time each forward link CDMA signal is received according to a reference clock and inserts the time data in a return link CDMA signal corresponding to each forward link CDMA signal received.

Gateway 104 uses the time data in each return link CDMA signal to calculate a corresponding time delay and performs a Fourier analysis of the return link CDMA signals to calculate a corresponding signal carrier frequency shift due to Doppler. Using the time delay and frequency shift calculations, gateway 104 inserts a delay in the transmission of each subsequent CDMA signal from gateway 104 so that the CDMA signals directed to intended subscriber 102 arrive at intended subscriber 102 from satellites 106 and 108 in coherent phase. The in-phase signals add constructively at intended subscriber 102's location, increasing the signal-to-noise ratio.

On the other hand, signals from gateway 104 directed to intended subscriber 102 arrive out of phase at unintended subscriber 112 located at a distance 110 from intended subscriber 102. The phase difference is determined by the geometry of the communications system and distance 110 between intended subscriber 102 and unintended subscriber 112. The out-phase signals interfere with each other and appear as interference noise.

Figure 2:
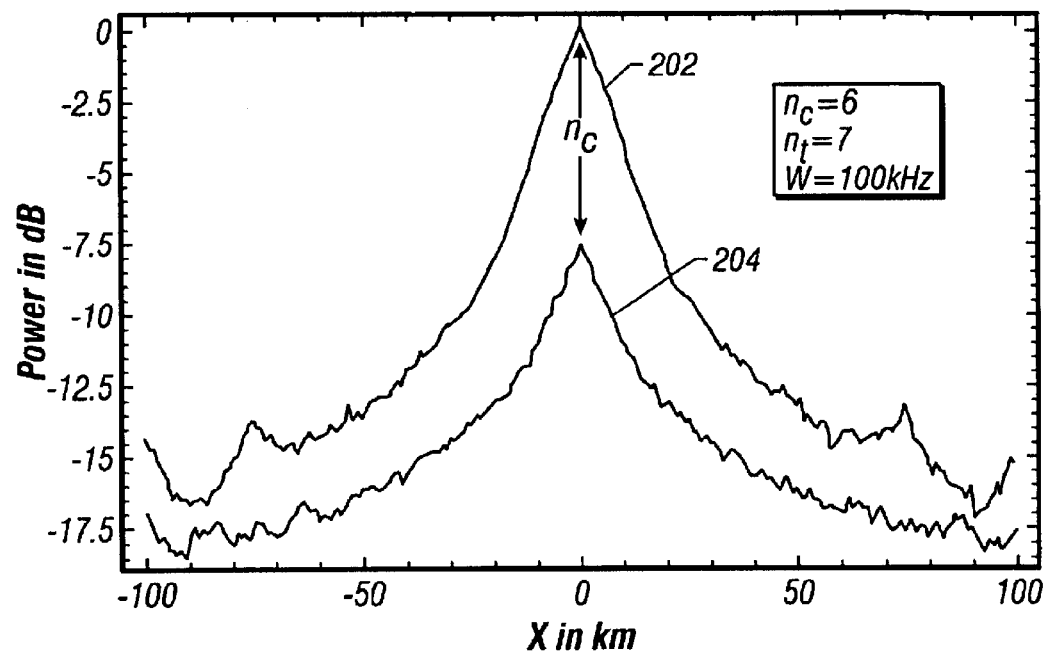
FIG. 2 is an exemplary plot of interference noise power integrated over the entire communications channel vs. distance from the intended subscriber.

FIG. 2 is an exemplary family of plot curves of interference noise power vs. distance from the intended subscriber using coherent phase synchronization for a randomly distributed multiple transponder platform constellation of seven satellites, a CDMA code length of six, and a frequency bandwidth of 100 kHz. Using the same CDMA code for the intended subscriber results in a maximum interference noise power of 0 dB at zero distance shown in curve 202, while using a different CDMA code for the unintended subscriber reduces integrated interference noise power at zero distance by about 7.5 dB as shown in curve 204. As the distance increases, the difference in interference noise power between using the same CDMA code vs. using different CDMA codes becomes less significant. The present invention exploits this feature to make CDMA codes reusable given adequate distance between subscribers within the same service area.

Figure 3:
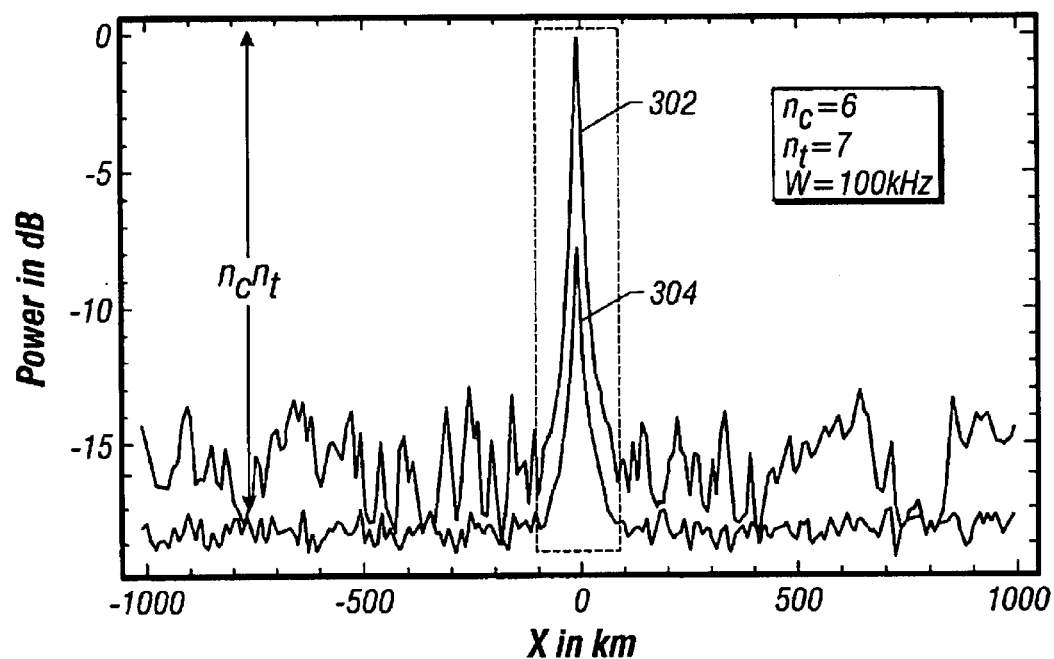
FIG. 3 is an exemplary plot of interference noise power integrated over the entire communications channel vs. distance from the intended subscriber on a larger distance scale.

FIG. 3 is an exemplary family of plot curves of interference noise power integrated over the entire communications channel vs. distance from the intended subscriber on a larger distance scale. Again, using the same CDMA codes for multiple subscribers shown in curve 302 compared to using different CDMA codes shown in curve 304 does not substantially increase the interference noise power relative to the signal gain achieved by coherent phase synchronization.

Figure 4:
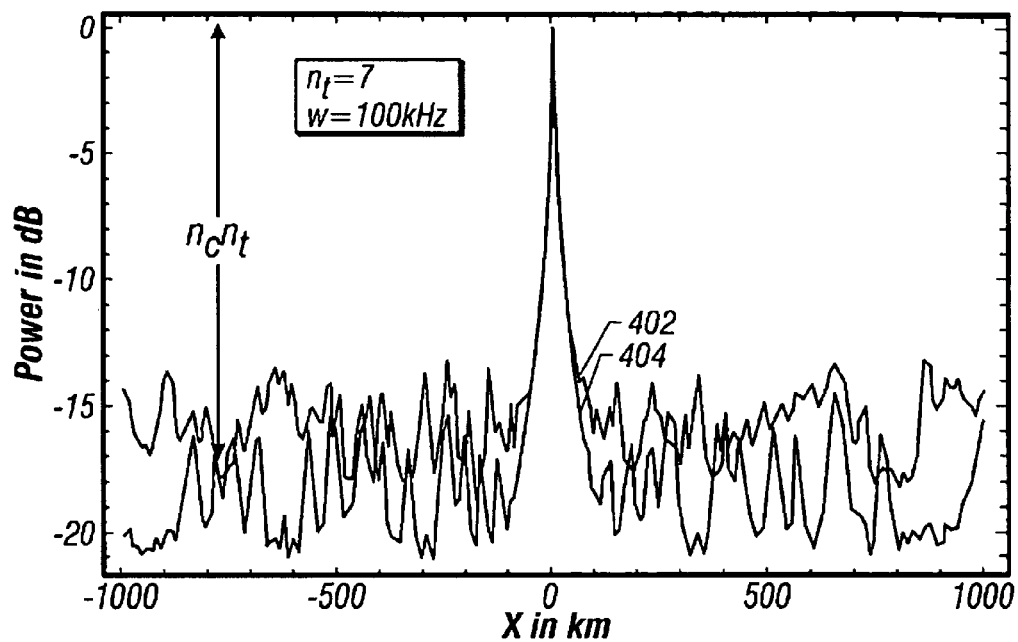
FIG. 4 is an exemplary plot of interference noise power integrated over the entire communications channel vs. distance from an intended subscriber using the same CDMA codes with different CDMA code lengths.

FIG. 4 is an exemplary family of plot curves of interference noise power integrated over the entire communications channel vs. distance from the intended subscriber using the same CDMA codes with CDMA code lengths of 6 shown in curve 402 and 10 shown in curve 404. On average, longer code lengths reduce the integrated interference noise power for unintended subscribers, even when using the same CDMA codes.

Figure 5:
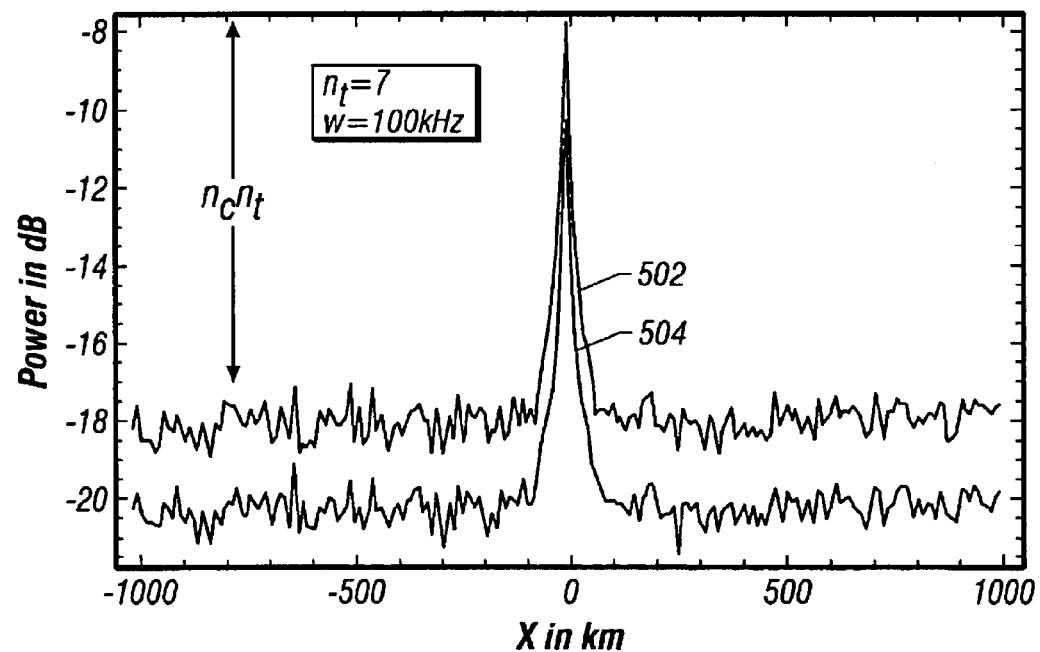
FIG. 5 is an exemplary plot of interference noise power integrated over the entire communications channel vs. distance from an intended subscriber using different CDMA codes and different CDMA code lengths.

FIG. 5 is an exemplary family of plot curves of interference noise power vs. distance from the intended subscriber using different CDMA codes and CDMA code lengths of 6 shown in curve 502 and 10 shown in curve 504. When different CDMA codes are used, the difference in interference noise power vs. distance for unintended subscribers is more significant.

For synchronization of signals from multiple satellites, there is no need to determine the absolute positions of the platforms. The relative timing, frequency, and phase between platforms is sufficient to perform coherent phase synchronization of CDMA signals.

Although the range is substantially the same for a forward link and the corresponding return link, the processing delays and signal channel distortions may be different.

To determine the range between the gateway or hub and a subscriber, the gateway includes ranging calibration data in each message sent to each subscriber via each transponder platform to establish a subscriber range corresponding to each transponder platform. The subscriber receives the ranging calibration data from each transponder platform and returns a message to the gateway containing the time read from a reference clock.

Figure 6:
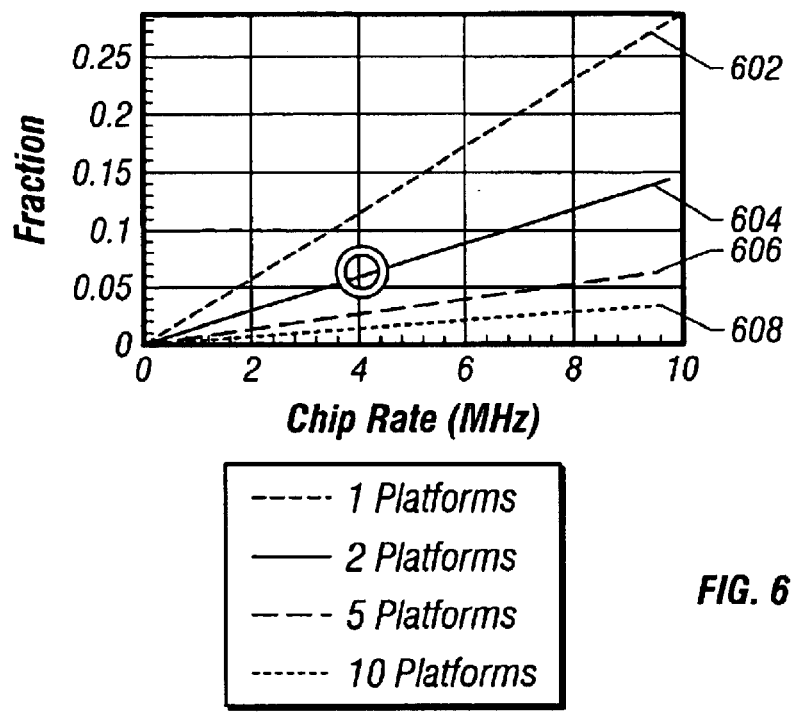
FIG. 6 is an exemplary family of plot curves of ranging calibration data overhead vs. chip rate.

FIG. 6 is an exemplary family of plot curves of ranging calibration data overhead vs. chip rate for a range rate of 60 m/sec and a data rate of 144 kHz for 10 satellites shown in curve 602, 5 satellites shown in curve 604, 2 satellites shown in curve 606, and 1 satellite shown in curve 608.

The gateway receives the subscriber message and performs a coherent phase synchronization calculation for each subscriber via each satellite. The gateway uses the coherent phase synchronization calculations to delay the signals transmitted to each satellites for each subscriber so that the signals for each subscriber from all of the transponder platforms arrive at each subscriber in coherent phase.

The coherent phase synchronization calculations include the steps of comparing the transmission time in the range calibration data with the reception time read from the subscriber's reference clock. The time difference is included in the subscriber's return signal. Several such time differences are measured and sent back to the gateway. The fraction of the chip time required for range calibration data is given substantially by:

$$\frac{T_X}{T_C + T_x} \quad (1)$$

where $T_x$ is message time allocated for the range calibration data, and $T_c$ is message time allocated for communications data. The accuracy of the ranging calibration is given substantially by:

$$\frac{C_W}{\sqrt{n_x}} \quad (2)$$

where $C_w$ is the chip width, and $n_x$ is the number of time differences measured. For a maximum range rate of 60 m/sec and a data rate of 144 KHz, a typical value for the fraction of chip time required for ranging calibration data is less than 5%.

The parameters used for the phase synchronization calculation are:

$n_b$=number of phase bits required to achieve phase coherency $\delta_f$=total frequency uncertainty $n_b$ depends on the number of platforms and the desired signal-to-noise ratio (typically 20 dB). $T_x$ is the product of $n_b$ times the chip duration.

$\delta_f$ represents the combined effects of CDMA carrier oscillator stability and relative motion among the gateway, the transponder platform, and the subscriber.

The Fourier period is determined by the required frequency accuracy substantially from the following formula:

$$\delta_f = \frac{1}{T_C + T_x} \quad (3)$$

The total number of samples required for the Fourier processing determines the fraction of the chip time required for range calibration data given by (1).

Figure 7:
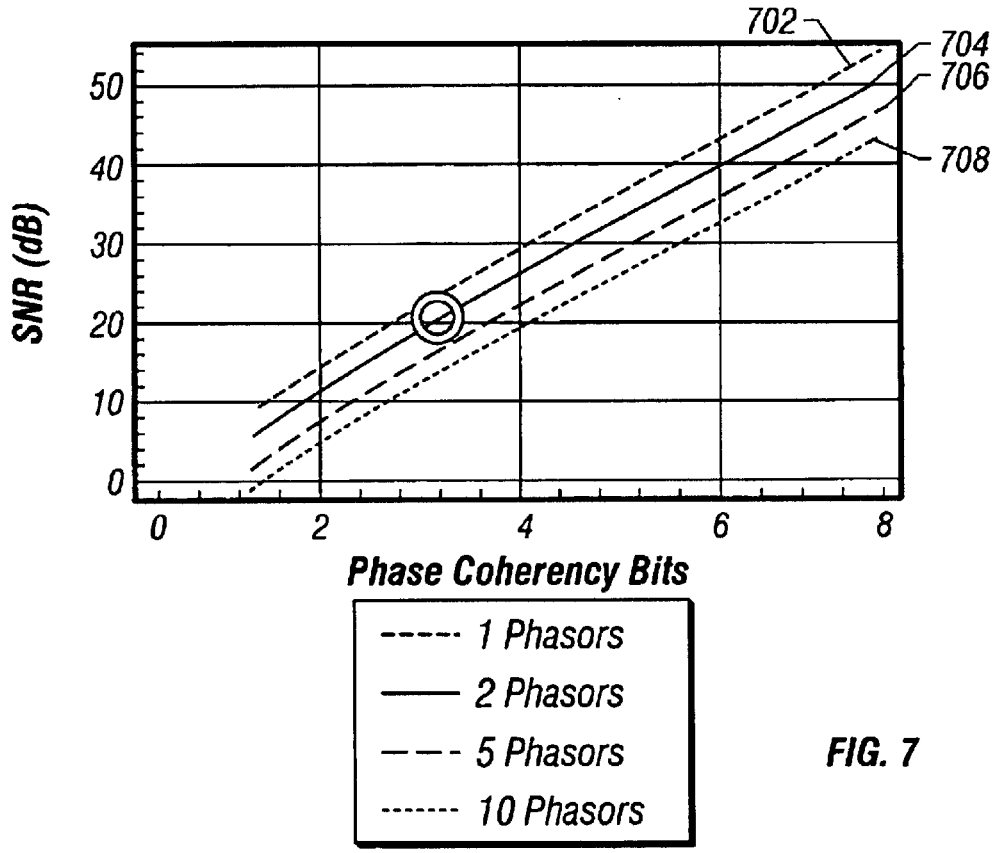
FIG. 7 is an exemplary family of plot curves of signal-to-noise ratio integrated over the entire communications channel vs. number of phase coherency bits.

FIG. 7 is an exemplary family of plot curves of signal-to-noise ratio vs. number of phase coherency bits used in the ranging calibration data for 10 satellites shown in curve 702, 5 satellites shown in curve 704, 2 satellites shown in curve 706, and 1 satellite shown in curve 708.

Figure 8:
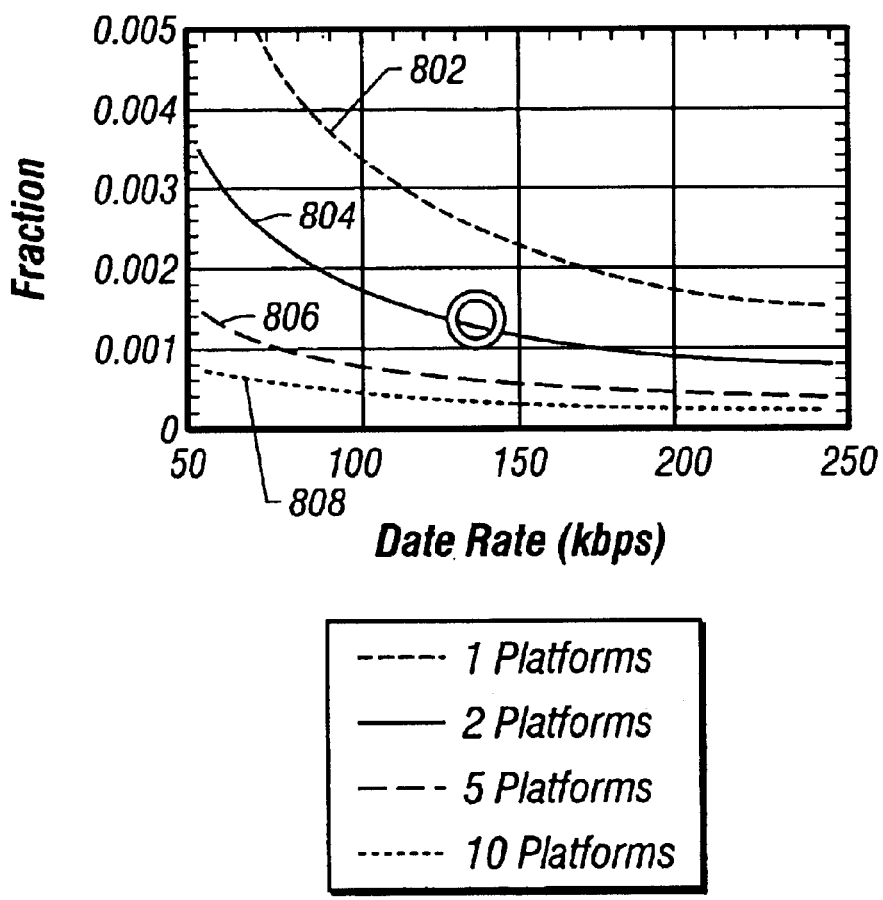
FIG. 8 is an exemplary plot of Fourier processing overhead as a fraction of resource vs. data rate.

FIG. 8 is an exemplary plot of Fourier processing overhead as a fraction of resource vs. data rate for 10 satellites shown in curve 802, 5 satellites shown in curve 804, 2 satellites shown in curve 806, and 1 satellite shown in curve 808. In this example, the range acceleration is 2 m/sec². As the number of transponder platforms increases, the Fourier processing overhead increases, but the difference becomes less significant with higher data rates. At a data rate of 144 KHz, for example, the overhead is only about 0.1% for a constellation of five satellites having a relative range rate of 2 m/sec². This overhead is insignificant compared to the typical resource fraction of chip time of 10% required for ranging calibration data at the same data rate at a chip rate of 4 mHz. At a range rate of 30 m/sec, the required resource is about 3%, and at 60 m/sec, about 6% assuming sequential processing. Alternatively, the ranging calculations may be done in parallel in the return link to reduce the Fourier processing overhead.

Figure 9:
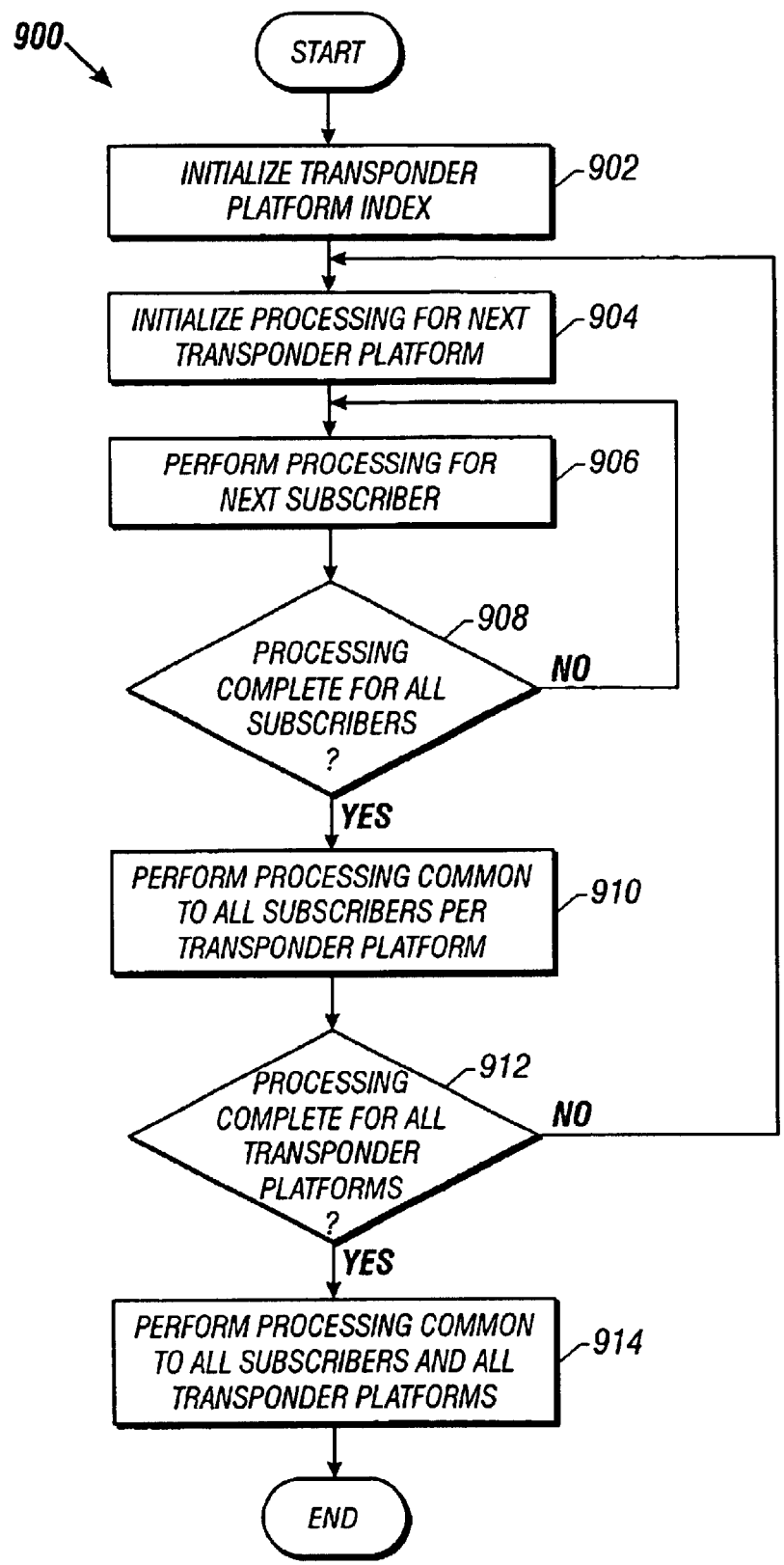
FIG. 9 is an exemplary flow chart 90 of a computer program for performing the coherent phase synchronization of the present invention.

FIG. 9 is a exemplary flow chart 900 of a computer program for performing the coherent phase synchronization of the present invention. At step 902 a transponder platform index is initialized that increments up to the total number of transponder platforms in the constellation.

At step 904 processing is initialized for the next transponder platform. In this step statistical data is cleared comprising the average signal propagation delay, frequency, and phase between the gateway and each subscriber within the transponder platform's coverage area. A subscriber index is initialized that increments up to the total number of subscribers.

Figure 9A:
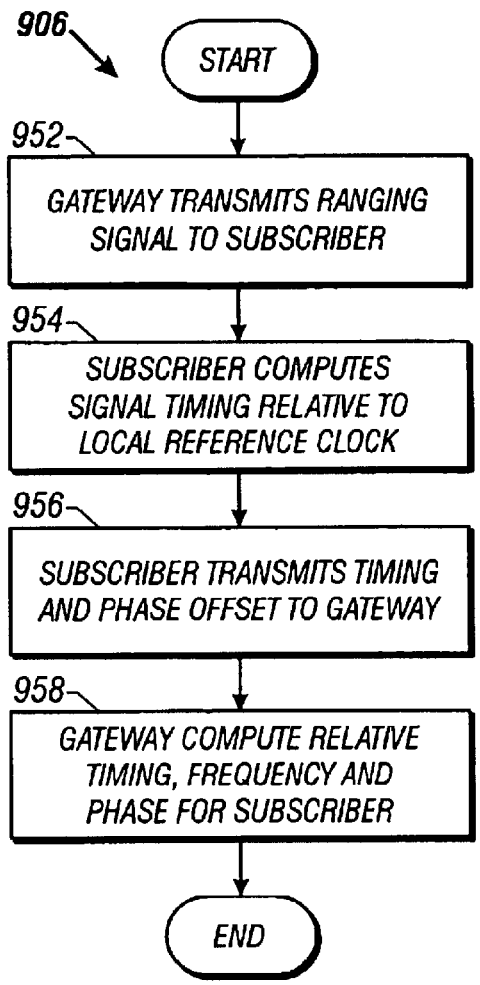
FIG. 9A is a flow chart of step 906 in FIG. 9.

At step 906 the processing for each subscriber within the transponder platform's coverage area is performed. FIG. 9A shows step 906 in further detail. At step 952 the gateway transmits a ranging signal to the subscriber. The ranging signal may contain an identification code unique to the subscriber to avoid interference from other subscribers receiving the ranging signal. When the subscriber receives the ranging signal at step 954, it computes the signal propagation delay and phase information relative to a local reference clock. At step 956 the subscriber transmits the signal timing and phase information to the gateway. When the gateway receives the information at step 958, it computes the signal timing, frequency, and phase for the subscriber relative to the transponder platform using, for example, statistical averaging or Fourier analysis. Other methods may be used according to well known techniques.

Referring back to FIG. 9, the subscriber index is incremented at step 908. If not all subscribers have been processed, processing continues from step 906 above. Otherwise the processing common to all the subscribers within the transponder platform's coverage area is performed at step 910.

Figure 9C:
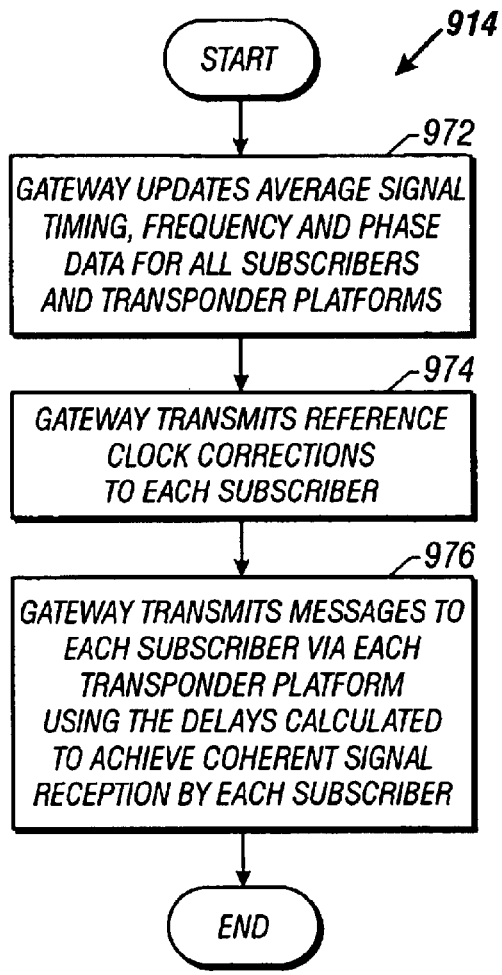
FIG. 9C is a flow chart of step 914 in FIG. 9.
Figure 9B:
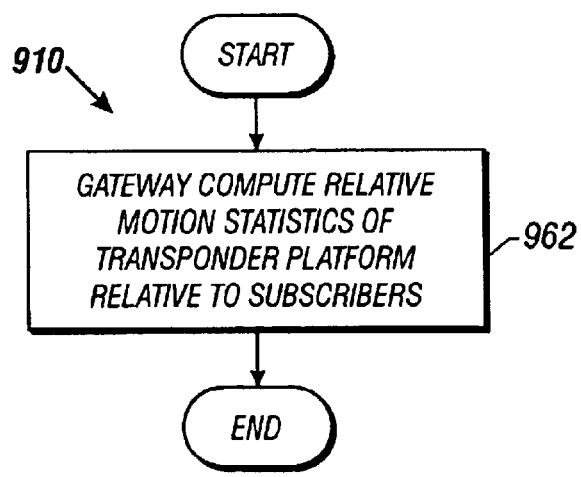
FIG. 9B is a flow chart of step 910 in FIG. 9.

FIG. 9B shows step 910 in further detail. At step 962 the gateway computes the relative motion statistics of the transponder platform relative to the subscribers for updating signal timing estimates.

Referring back to FIG. 9, the transponder platform index is incremented at step 912. If not all transponder platforms have been processed, processing continues at step 904 above. Otherwise processing continues at step 914.

FIG. 9C shows step 914 in further detail. At step 972 the gateway updates the average signal timing, frequency, and phase data for all subscribers and all transponder platforms. At step 974 the gateway transmits reference clock corrections to each subscriber to synchronize the signal phase of each subscriber with respect to the gateway. At step 976 the gateway continues transmitting communications messages to each subscriber via each transponder platform using the delays calculated to achieve coherent signal reception by each subscriber.

By the process described above the gateway delays the transmission of a CDMA signal for an intended subscriber to each transponder platform or satellite in the constellation by the correct amount to achieve phase coherency of the signals at the subscriber's location. In addition, the gateway may also adjust the frequency of the CDMA signal for the intended subscriber to each transponder platform to compensate for doppler shift so that the signals arriving at the intended subscriber from each transponder platform have the same frequency.

The synchronization process described above is preferably done in the background to minimize interruption of communications messages. When computations are completed for all transponder platforms in the constellation, processing is terminated until another iteration is performed to accommodate changes in position and motion of the transponder platforms and the subscribers.

Figure 10:
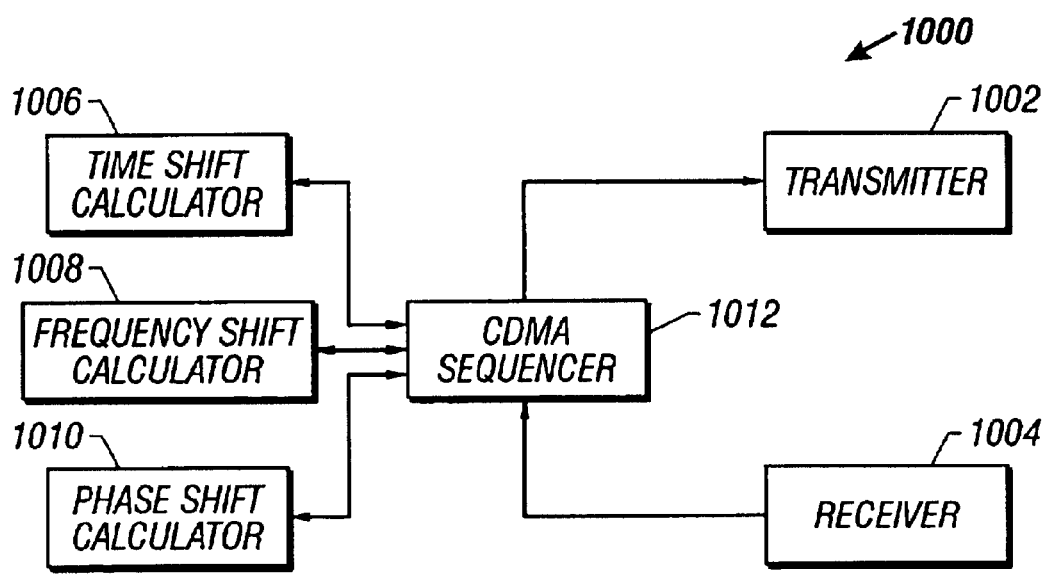
FIG. 10 is an embodiment of the present invention in a gateway 1000 for performing the functions in FIG. 9.

FIG. 10 shows an embodiment of the present invention in a gateway 1000 for performing the functions described in FIG. 9. Transmitter 1002 transmits the ranging and delayed communications signals to the subscriber. Receiver 1004 receives the signal timing and phase information from the intended subscriber. The signal timing, frequency, and phase are calculated respectively by time shift calculator 1006, frequency shift calculator 1008, and phase shift calculator 1010. CDMA sequencer 1012 transmits the reference clock corrections to each subscriber to synchronize the signal phase of each subscriber with respect to gateway 1000.

Other modifications, variations, and arrangements of the present invention may be made in accordance with the above teachings other than as specifically described to practice the invention within the scope of the following claims.

We claim:

1. A method for synchronizing a CDMA communications signal including the following steps:

transmitting a sequence of forward link CDMA signals from a gateway to an intended subscriber via multiple transponder platforms wherein the forward link CDMA signals comprise ranging calibration data representative of the time each forward link CDMA signal was transmitted from the gateway to each transponder platform;

receiving a sequence of return link CDMA signals from the intended subscriber wherein the return link CDMA signals comprise ranging calibration representative of the time each forward link CDMA signal was received by the intended subscriber from each transponder platform;

and finding a corresponding time from the ranging calibration data for transmitting subsequent CDMA signals from the gateway to each transponder platform so that subsequent CDMA signals from the multiple transponder platforms arrive at the intended subscriber in substantially the same phase.

2. The method of claim 1 wherein the step of finding a corresponding time for transmitting subsequent CDMA signals includes the step of calculating a time shift of the return link CDMA signal relative to the forward link CDMA signal.

3. The method of claim 1 wherein the step of finding a corresponding time for transmitting subsequent CDMA signals includes the step of calculating a frequency shift of the return link CDMA signal relative to the forward link CDMA signal.

4. The method of claim 1 wherein the step of finding a corresponding time for transmitting subsequent CDMA signals includes the step of calculating a phase shift of the of the return link CDMA signal relative to the forward link CDMA signal.

5. The method of claim 1 wherein CDMA signals arrive at an unintended subscriber from each transponder platform at a substantially different time, frequency, or phase.

6. A method for synchronizing a CDMA communications signal including the following steps: transmitting a ranging signal from a gateway to a subscriber via multiple transponder platforms; computing a signal propagation time relative to a subscriber local reference clock;

transmitting signal timing and phase offset information from the subscriber to the gateway via each transponder platform;

computing relative signal timing and phase data from the signal timing and phase offset information for the subscriber and each transponder platform;

computing relative motion statistics of each transponder platform relative to the subscriber from the signal timing and phase data;

averaging the signal timing and phase data for the subscriber and each transponder platform to calculate a subscriber reference clock correction;

and transmitting the subscriber reference clock correction from the gateway to the subscriber to synchronize the subscriber reference clock so that the subscriber receives subsequent CDMA signals transmitted concurrently from the gateway to the subscriber via each transponder platform in substantially the same phase.

7. The method of claim 6 wherein CDMA signals arrive at an unintended subscriber from each transponder platform at a substantially different time, frequency, or phase.

8. An apparatus for synchronizing a CDMA communications signal comprising:

a transmitter for transmitting a sequence of forward link CDMA signals from a gateway to an intended subscriber via multiple transponder platforms wherein the forward link CDMA signals comprise ranging calibration data representative of the time each forward link CDMA signal was transmitted by the gateway to each transponder platform;

a receiver for receiving a sequence of return link CDMA signals from the intended subscriber to the gateway via the multiple transponder platforms wherein the return link CDMA signals comprise ranging calibration data representative of the time each forward link CDMA signal was received by the intended subscriber from each transponder platform;

and a CDMA signal sequencer for delaying the transmission of each subsequent CDMA signal to the intended subscriber so that each subsequent CDMA signal arrives at the intended subscriber from each transponder platform in substantially the same phase.

9. The apparatus of claim 8 further comprising a time shift calculator coupled to the CDMA signal sequencer for calculating a time shift of the return link CDMA signal relative to the forward link CDMA signal.

10. The apparatus of claim 8 further comprising a frequency shift calculator couple to the CDMA signal sequencer for calculating a frequency shift of the return link CDMA signal relative to the forward link CDMA signal.

11. The apparatus of claim 8 further comprising a phase shift calculator couple to the CDMA signal sequencer for calculating a phase shift of the of the return link CDMA signal relative to the forward link CDMA signal.

12. The apparatus of claim 8 wherein CDMA signals arrive at an unintended subscriber from each transponder platform at a substantially different time, frequency, or phase.

* * * * *